United States Patent
Shen et al.

(10) Patent No.: US 9,521,337 B1
(45) Date of Patent: Dec. 13, 2016

(54) RESET-MARKING PIXEL SENSOR

(71) Applicant: Rambus Inc., Sunnyvale, CA (US)

(72) Inventors: Jie Shen, Fremont, CA (US); Yueyong Wang, Sunnyvale, CA (US); James E. Harris, San Jose, CA (US)

(73) Assignee: Rambus Inc., Sunnyvale, CA (US)

( * ) Notice: Subject to any disclaimer, the term of this patent is extended or adjusted under 35 U.S.C. 154(b) by 510 days.

(21) Appl. No.: 13/936,985

(22) Filed: Jul. 8, 2013

Related U.S. Application Data

(60) Provisional application No. 61/671,586, filed on Jul. 13, 2012.

(51) Int. Cl.
| | | |
|---|---|---|
| *H01L 27/00* | (2006.01) | |
| *H04N 5/335* | (2011.01) | |
| *H04N 5/235* | (2006.01) | |
| *H04N 5/353* | (2011.01) | |
| *H04N 5/355* | (2011.01) | |

(52) U.S. Cl.
CPC .......... *H04N 5/3355* (2013.01); *H04N 5/2353* (2013.01); *H04N 5/355* (2013.01); *H04N 5/3535* (2013.01)

(58) Field of Classification Search
CPC .. H04N 3/1556; H04N 3/1562; H04N 3/1568; H04N 3/1581; H04N 5/35518; H04N 5/35527; H04N 5/35554; H04N 5/3559; H04N 5/3745; H04N 5/37452; H04N 5/3355; H04N 5/3535; H04N 5/2353; H04N 5/355
USPC ............................. 250/208.1; 348/308, 294
See application file for complete search history.

(56) References Cited

U.S. PATENT DOCUMENTS

| | | | |
|---|---|---|---|
| 6,229,133 B1 * | 5/2001 | Hynecek | H01L 27/14609 250/208.1 |
| 7,492,400 B2 | 2/2009 | El Gamal et al. | |
| 8,022,350 B2 | 9/2011 | Ackland | |
| 9,236,409 B2 * | 1/2016 | Aleksi | H01L 27/14609 |
| 9,324,745 B2 * | 4/2016 | Yazici | H01L 27/14609 |
| 2007/0012868 A1 * | 1/2007 | Stoppa | H04N 5/335 250/214 R |
| 2008/0316347 A1 * | 12/2008 | Gamal | H04N 5/2351 348/296 |
| 2009/0002535 A1 * | 1/2009 | Park | H04N 3/1568 348/308 |

(Continued)

OTHER PUBLICATIONS

Kavusi, S. et al., "Architectures for high dynamic range, high speed image sensor readout circuits", Proc. Very Large Scale Integration, 2006 IFIP Int. Conf., pp. 36-41, 2006. 6 pages.

(Continued)

*Primary Examiner* — Georgia Y Epps
*Assistant Examiner* — Kevin Wyatt
(74) *Attorney, Agent, or Firm* — Charles Shemwell

(57) ABSTRACT

A self-resetting pixel having a memory element to record occurrence of an asynchronous pixel reset and circuitry to enable the memory element to be digitally sampled and cleared is disclosed, together with embodiments of digital image sensors formed by arrays or other collections of such pixels. By marking occurrence of asynchronous reset events within an in-pixel memory element that may be digitally oversampled during an exposure interval (i.e., repeatedly read-out in the form of, for example, a single-bit), it becomes possible to check for and detect asynchronous pixel reset events frequently and efficiently.

21 Claims, 5 Drawing Sheets

(56) References Cited

U.S. PATENT DOCUMENTS

| | | | |
|---|---|---|---|
| 2010/0140732 A1* | 6/2010 | Eminoglu | H01L 27/14634 257/447 |
| 2010/0194956 A1* | 8/2010 | Yuan | H04N 5/35527 348/308 |
| 2010/0277607 A1 | 11/2010 | Choi et al. | |
| 2015/0015759 A1* | 1/2015 | Kayahan | H04N 5/355 348/308 |

OTHER PUBLICATIONS

Kavusi, S. et al., "Folded multiple-capture: An architecture for high dynamic range disturbance-tolerant focal plane array", Proc. SPIE Infrared Technology and Applications, vol. 5406, pp. 351-360, 2004. 10 pages.

Kavusi, S. et al., "Quantitative study of high-dynamic range SigmaDelta-based focal plane array architectures", Proc. SPIE Defense and Security Symp., pp. 341-350, 2004. 10 pages.

Kavusi, S. et al., "A 0.18μm CMOS 1000 frames/sec, 138dB Dynamic Range Readout Circuit for 3D-IC IR Focal Plane Arrays," IEEE Custom Integrated Circuits Conference, pp. 229-232, Sep. 2006. 4 pages.

Kavusi, S., et al., "A quantitative study of high dynamic range image sensor architectures", Proc. SPIE, pp. 264-275, 2004. 12 pages.

Kim, Dongsoo et al., "A Dual-Capture Wide Dynamic Range CMOS Image Sensor Using Floating-Diffusion Capacitor," IEEE Transactions on Electron Devices, vol. 55, No. 10, pp. 2590-2594, Oct. 2008. 5 pages.

Kim, H. et al., "PD-Storage dual-capture variable wide dynamic range CMOS image sensor," Electronic Letters, Nov. 10, 2011, vol. 47, No. 23. 2 pages.

Koppa, S. et al,, "A 105.6dB DR and 65dB peak SNR self-reset CMOS image sensor using a Schmitt trigger circuit," 2011 IEEE 54th International Midwest Symposium on Circuits and Systems (MWSCAS), pp. 1-4, Aug. 7-10, 2011. 4 pages.

Liu, Xinqiao et al., "Synthesis of high dynamic range motion blur free image from multiple captures," IEEE Transactions on Circuits and Systems I: Fundamental Theory and Applications,, vol. 50, No. 4, pp. 530-539, Apr. 2003, 10 pages.

Park, Dongwon et al., "Wide dynamic range and high SNR self-reset CMOS image sensor using a Schmitt trigger," Sensors, 2008 IEEE, pp. 294-296, Oct. 26-29, 2008. 3 pages.

Spivak, A. et al., "Power-performance tradeoffs in wide dynamic range image sensors with multiple reset approach." J. Low Power Electron. Appl. 2011, 1, 59-76. 18 pages.

\* cited by examiner

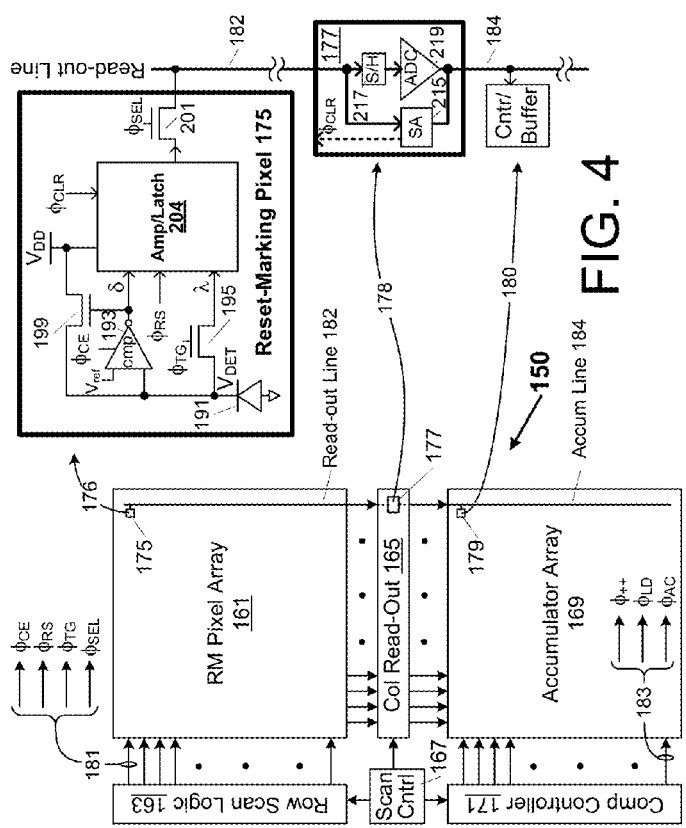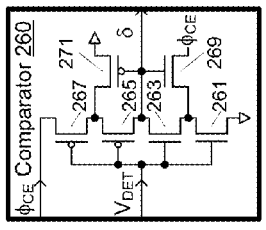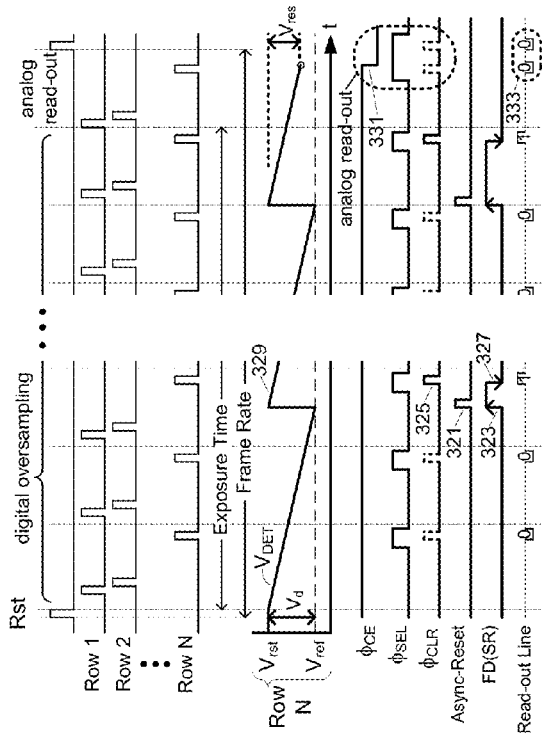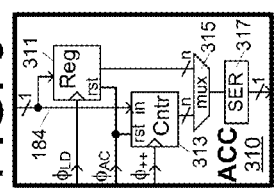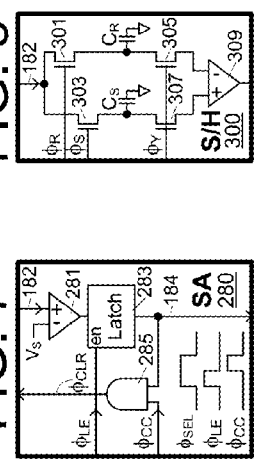

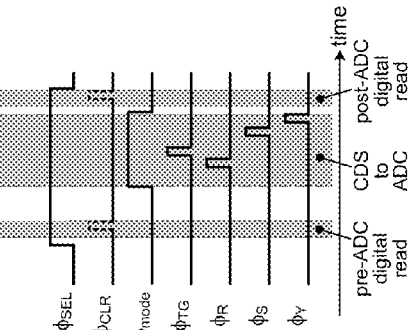
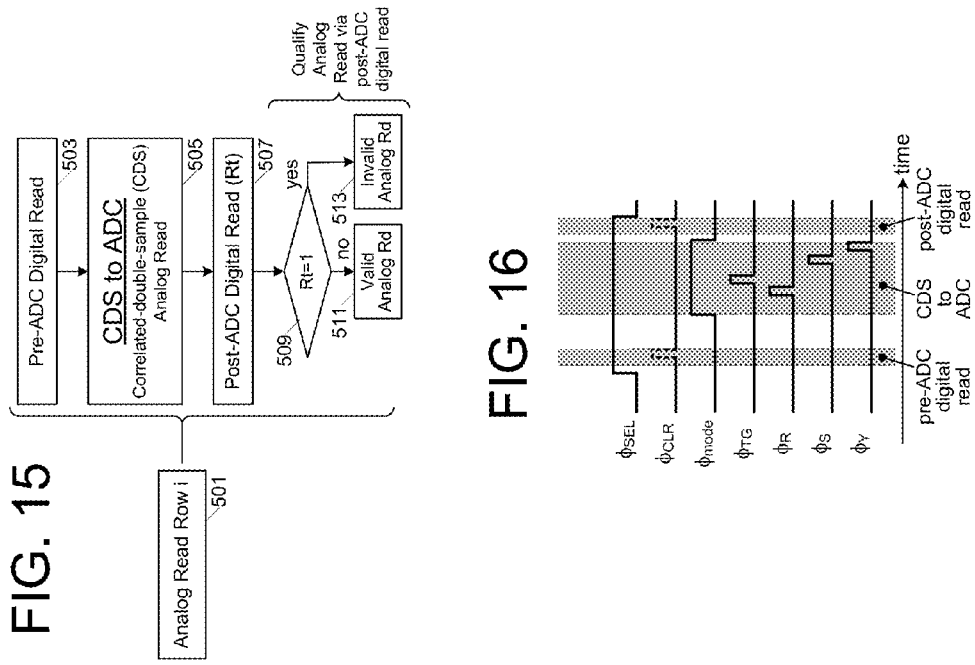
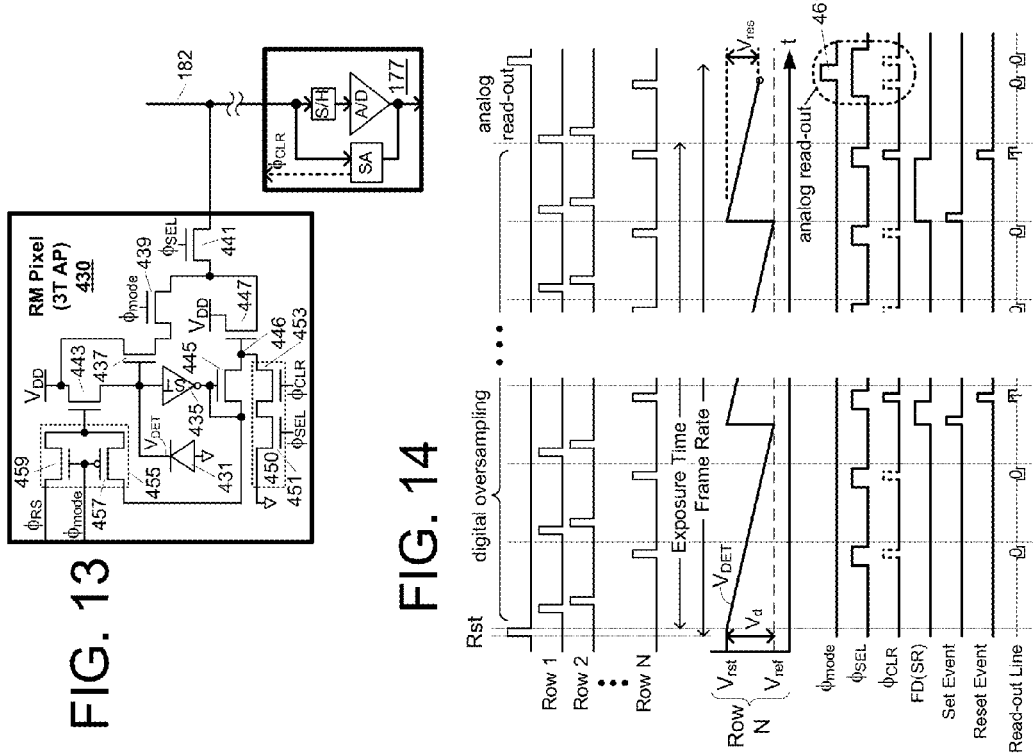

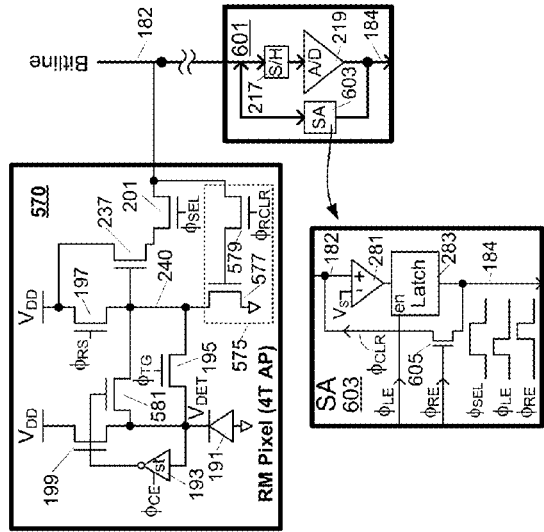
FIG. 17
FIG. 18
FIG. 19
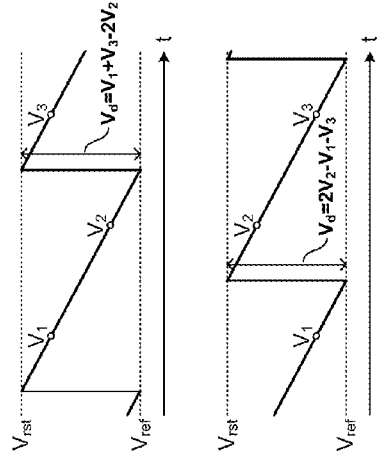
FIG. 20
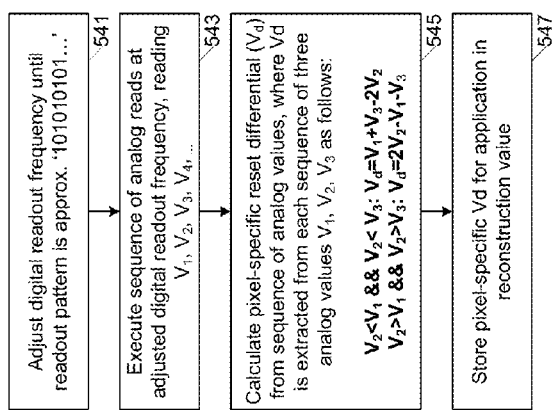
FIG. 21
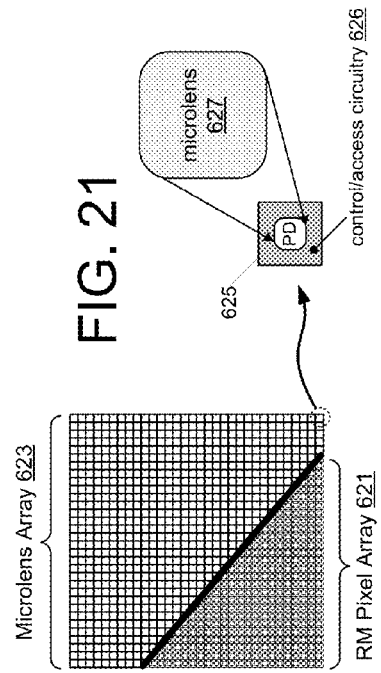
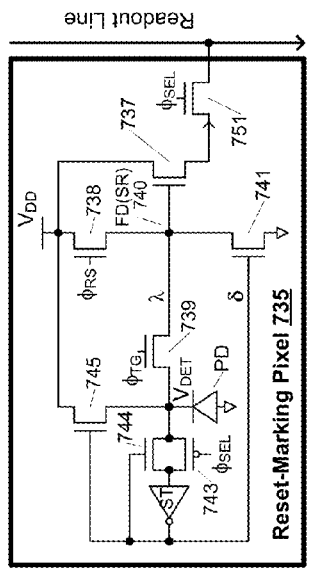

RESET-MARKING PIXEL SENSOR

TECHNICAL FIELD

The present disclosure relates to the fields of digital image sensors and digital image processing.

BACKGROUND

An active pixel sensor, the fundamental imaging component within a broad variety of video and still-image cameras, is formed by an array of active pixels, each containing a photodiode and a number of pixel-control transistors. Because the photodiode voltage discharges incrementally in response to incident light, a digital image may be captured by exposing a precharged pixel array (i.e., array of active pixels having charged photodiodes) to a light source for a period of time and then reading out and digitizing the residual photodiode voltages.

Because the photodiode discharges incrementally in response to photon strikes, the dynamic range of a conventional active pixel (i.e., the difference between the brightest and dimmest light levels that can be represented by the digitized output) is a function of the photodiode size (i.e., a larger photodiode can hold a greater initial charge), and the resolution of the analog-to-digital converter (ADC) used to digitize the photodiode output. Accordingly, the relatively small photodiodes and low-resolution ADCs typically deployed in low-end image sensors (e.g., in cell-phone cameras) tend to have commensurately low dynamic range, saturating quickly in bright light. Unfortunately, even in high-end digital sensors having relatively large photodiodes and complex high-resolution ADCs, the linear relationship between luminance and photodiode voltage yields a substantially lower dynamic range than, for example, the human eye.

One approach to extending the dynamic range of an active pixel involves temporally oversampling the pixel during an exposure interval to determine if the photodiode is approaching saturation and, if so, resetting the photodiode and counting the reset event. At the conclusion of the exposure interval, the number of reset events and the final sample of the photodiode voltage may be used to construct a pixel value for the entire exposure interval. Viewing the photodiode as a well or bucket for collecting photons, each oversampling/reset event constitutes an opportunity to re-use the well (and is thus referred to as "recycling the well") so that the effective size of the well and thus the dynamic range of the image sensor corresponds, approximately, to the product of the physical size of the photodiode and the temporal oversampling factor.

One problem with sample-driven well-recycling is that the photodiode may saturate between sampling/reset instants, resulting in an unknown number of uncounted photon strikes and thus distortion in the final output value. In one well-recycling variant, circuitry is provided within each active pixel to monitor the photodiode voltage and asynchronously "self-reset" the photodiode upon reaching a near-saturation threshold, thereby avoiding saturation. Because the photodiode discharge is monotonic, occurrence of an asynchronous reset may be inferred (i.e., detected and counted) by an increase in the photodiode voltage read-out and digitized in successive sampling instants. Unfortunately, the relatively slow and power-hungry ADC operation limits the number of samples that may be acquired in a given exposure interval. Consequently, the improvement in dynamic range tends to be modest and comes with a significant power consumption penalty.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which:

FIG. 4 illustrates another embodiment of a reset-marking pixel sensor, presenting additional detail with respect to the sensor architecture;

FIG. 5 illustrates a more detailed embodiment of amplifier/latching circuit that may be used to implement the event-memory, amplifier and multiplexer-node functions within reset-marking pixel of FIG. 4;

FIG. 6 illustrates an embodiment of a Schmitt trigger circuit that may be used to implement threshold-comparator of FIG. 4;

FIG. 7 illustrates an embodiment of a sense amplifier that may be used to implement sense amplifier within the exemplary read-out circuit of FIG. 4;

FIG. 8 illustrates an embodiment of a sample-and-hold circuit that may be used to implement the sample-and-hold element shown in FIG. 4 and thus support correlated double-sampling within the image sensor of FIG. 4;

FIG. 9 illustrates an embodiment of an accumulator cell that may be used to implement each of the counter/buffer circuits within the accumulator array shown in FIG. 4;

FIG. 10 is a timing diagram illustrating an exemplary sampling sequence within the reset-marking pixel array of FIG. 4, together with an example of a control signal sequence with respect to one pixel row;

FIG. 13 illustrates an alternative embodiment of a reset-marking pixel formed by a three-transistor active pixel in conjunction with asynchronous reset circuitry, and a settable/resettable event memory;

FIG. 14 is a timing diagram illustrating an exemplary sampling sequence within an array of the reset-marking pixels shown in FIG. 13, together with an example of a control signal sequence with respect to one pixel row;

FIG. 15 illustrates a qualification operation that may be executed in connection with an analog-read out of the reset-marking pixel shown in FIG. 13;

FIG. 16 illustrates an exemplary control signal sequence corresponding to an analog read operation within the exemplary reset-marking pixel of FIG. 13;

FIG. 17 illustrates an exemplary sequence of operations that may be carried out to perform per-pixel calibration of the difference between the pixel reset voltage and near-saturation threshold voltage;

FIG. 18 illustrates exemplary photodiode waveforms and analog samples thereof that may be applied in an algebraic determination of the difference between the pixel reset voltage and near-saturation threshold voltage;

FIG. 19 illustrates an alternative embodiment of a reset-marking pixel that may be deployed within a reset-marking pixel array;

FIG. 20 illustrates an alternative embodiment of a reset-marking pixel that may be deployed within a reset-marking pixel array; and FIG. 21 illustrates a microlens array that may be disposed over a reset-marking pixel array to increase the effective fill-factor.

DETAILED DESCRIPTION

A self-resetting pixel having a memory element to record occurrence of an asynchronous pixel reset and circuitry to enable the memory element to be digitally sampled and cleared is disclosed in various embodiments, together with embodiments of digital image sensors formed by arrays or other collections of such pixels. By marking occurrence of asynchronous reset events within an in-pixel memory element that may be digitally oversampled during an exposure interval (i.e., repeatedly read-out in the form of, for example, a single-bit), it becomes possible to check for and detect asynchronous pixel reset events more frequently and efficiently than with conventional analog-read-and-compare techniques, significantly increasing dynamic range and reducing power at the same time.

Figure 1:
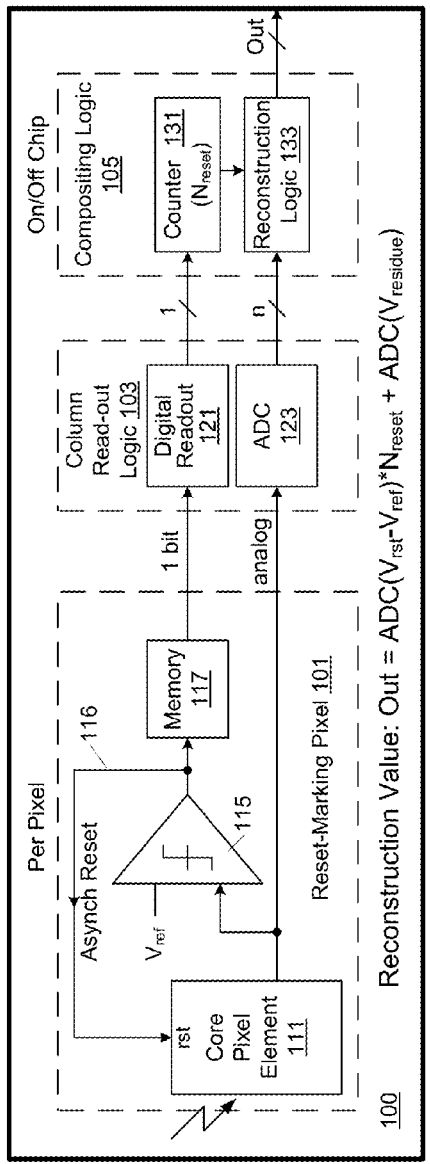
FIG. 1 illustrates an embodiment of an image sensor implemented by an array of reset-marking pixels together with column read-out logic and compositing logic.

FIG. 1 illustrates an embodiment of an image sensor 100 implemented by an array of reset-marking pixels 101 (i.e., self-resetting pixels having respective memory elements to record asynchronous reset events) together with column read-out logic 103 and compositing logic 105. Each reset-marking pixel 101 (only one of which is shown) includes a core pixel element 111, threshold-comparator 115, and event memory 117. The core pixel element may be implemented, for example, by a three-transistor or four-transistor (3T or 4T) active pixel having a photodiode or other photosensitive element that exhibits a decaying (or otherwise changing) analog voltage output in response to incident light. Threshold-comparator 115 is coupled to receive an analog output from core pixel element 111 and asserts an asynchronous reset signal 116 whenever the analog output drops below a threshold, ($V_{ref}$), which can be selected to preferably fall in a linear response region of the photodiode, but nearer the saturation end of the pixel response function. In such an embodiment, assertion of the asynchronous reset signal signals a near-saturation condition (i.e., voltage on photosensitive element is approaching a minimum at which it will flat-line). As shown, asynchronous reset signal 116 is fed back to a reset input ("rst") of core pixel element 111 and is also supplied to event memory 117. By this arrangement, each assertion of asynchronous reset signal 116 resets core pixel element 111 (e.g., restoring the charge on the photodiode or other photosensitive/light-sensitive element thereof to a "reset" voltage) and also is latched within event memory 117, for example, flipping the state of a bi-stable latching element from a logic '0' to a logic '1' or vice-versa.

Over the course of an exposure interval, event memory 117 is repeatedly sampled (i.e., oversampled at a rate that exceeds the reset rate produced by a maximum expected photon flux) by digital readout circuitry 121 within column-readout logic 103, with each reset-event readout (e.g., logic '1' sample) triggering an event-memory reset operation and also incrementing a reset-event counter 131 within compositing logic 105. At the conclusion of the exposure interval, the analog output of core pixel element 111, referred to herein as the residual pixel voltage, is sampled and converted to an n-bit digital value within analog-to-digital converter 123 (ADC). The digitized residual pixel voltage (output from ADC 123) and event-counter tally are supplied to (and optionally buffered within) reconstruction logic 133, which applies those values to construct a final pixel value ("Out") for the exposure interval. In one embodiment, for example, the final pixel value is constructed by multiplying a digitized measure of the difference between the reset voltage and near-saturation threshold voltage by the number of reset events signaled by counter 131 and adding the digitized measure of the residual pixel voltage supplied by ADC 123. As discussed below, calibration operations may be executed to compensate for pixel-to-pixel variance between the reset and near-saturation threshold voltages (referred to herein as the reset differential, $V_d$) and/or drift due to changes in temperature and voltage. As discussed below, all or part of compositing logic 105 may be implemented in a separate integrated circuit (IC) die from reset-marking pixels 101 and column read-out logic 103.

Figure 2:
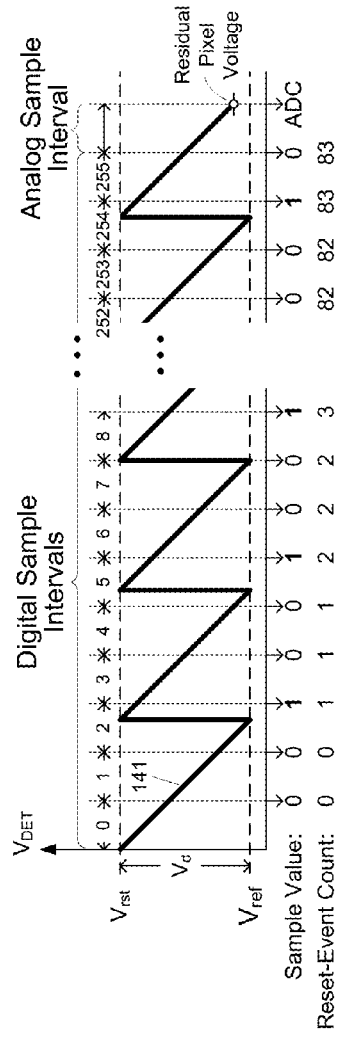
FIG. 2 illustrates an exemplary exposure interval in which a reset-marking pixel is digitally oversampled, followed by an analog sampling of the residual pixel voltage.

FIG. 2 illustrates an exemplary exposure interval in which a reset-marking pixel is digitally oversampled 256 times, followed by an analog sampling of the residual pixel voltage. In the example shown, a steady photon flux is assumed, yielding a relatively constant pixel voltage decay (141) that traverses the reset differential (e.g., fills the photodiode well) approximately once every 2.7 digital sample intervals to produce an asynchronous reset. Accordingly, logic '0' (no-event) samples are acquired at the conclusion of the first two digital sample intervals, followed by a logic '1' (reset-event detected) sample at the conclusion of the third sample interval (i.e., digital sample interval 2). The reset-event sample triggers a memory clearing operation within the pixel so that the event-memory is re-armed to detect the subsequent reset event that occurs during digital sample interval 5, and then again at digital sample intervals 8, 10, . . . , and 254. As shown, each reset-event sample increments the reset-event count (e.g., within counter 131 of FIG. 1), yielding an exemplary tally of 83 reset events at the conclusion of the final digital sample interval, which is followed by an analog sample of the residual pixel voltage in an ADC operation.

In the exemplary exposure interval shown in FIG. 2, the core pixel element was reset 83 times (reflecting an effective well size and dynamic range dramatically larger than if no well cycling were possible) with no pixel saturation, and without requiring multiple, slow and power-draining analog pixel read-outs. Further, while 256× digital oversampling is shown, the low overhead of the digital sampling operation enables substantially higher digital oversampling factors to be achieved in other embodiments, further extending the effective well size and dynamic range.

Figure 3:
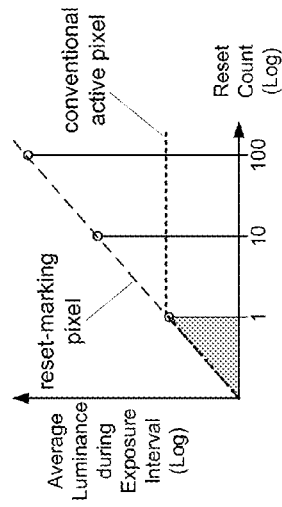
FIG. 3 illustrates the enhanced dynamic range that may be achieved by the reset-marking pixel of FIG. 1.

FIG. 3 illustrates the enhanced dynamic range that may be achieved by the reset-marking pixel of FIG. 1, logarithmically plotting the average luminance during the exposure interval against the reset count. Whereas a conventional active pixel saturates upon reaching the full well state, the reset-marking pixel may be reset (recycling the well) hundreds or even thousands of times per exposure interval, all without pixel saturation (as in the case of synchronous reset schemes) or power-consuming analog oversampling.

FIG. 4 illustrates another embodiment of a reset-marking pixel sensor 150, presenting additional detail with respect to the sensor architecture. As shown, an array 161 of reset-marking pixels 175 is coupled to receive row control signals 181 from row scan logic 163, and to output digital and analog sample values to column read-out logic 165 via column read-out lines 182. An accumulator array 169, formed by an array of counter/buffer circuits 179 that correspond to respective pixels 175 within reset-marking pixel array 161, is coupled to receive read-out results from column read-out logic 165 via accumulator lines 184 and also to receive accumulator control 183 signals from compositing controller 171. A scan control circuit 167 serves as the timing and control center for image capture operations, outputting timing and control signals to row scan logic 163, column read-out logic 165 and compositing controller 171 to coordinate operations within pixel array 161 and accumulator array 169.

An exemplary embodiment of a reset-marking pixel 175 within pixel array 161 is shown in detail view 176. As in other embodiments described below, a photodiode 191 is employed as the photosensitive element, though in all cases other types of light-sensitive elements may be used. The cathode of the photodiode (also referred to herein as the photodiode output or voltage detection node, $V_{DET}$) is switchably coupled to column read-out line 182 via transfer gate 195, amplifier/latch circuit 204, and sample gate 201, thus enabling the photodiode voltage to be sampled in an analog sampling operation by asserting transfer-enable signal $\phi_{TG}$ and sample-enable signal $\phi_{SEL}$ at respective control inputs of the transfer gate and sample gate. The photodiode output is also coupled to a threshold-comparator 193 which asserts an asynchronous-reset signal (δ) whenever $V_{DET}$ drops below a near-saturation threshold ($V_{ref}$). As shown, the comparator output is coupled to amplifier/latch circuit 204 and to the control input of asynchronous-reset gate 199, the latter being coupled between the photodiode output and a reset voltage source ($V_{DD}$ in this example). By this arrangement, each assertion of the asynchronous-reset signal switches on the asynchronous-reset gate to recharge the photodiode to the reset potential (i.e., $V_{rst}$, which may be, for example, $V_{DD}$ less the threshold voltage of gate 199, or a lower voltage at which the photodiode is fully depleted) and also flips the state of an event-memory (e.g., from a logic '0' to a logic '1' in the examples herein, though the reverse state change may be implemented in alternative embodiments) within amplifier/latch 204 to mark the pixel-reset event. Amplifier/latch 204 also, in some embodiments, receives a memory-clear signal, $\phi_{CLR}$, which resets the event-memory to the non-triggered (e.g., logic '0') state. As explained below, the memory-clear signal may be ANDed with the sample-enable signal ($\phi_{SEL}$) or other control signal(s) to effect memory clearing operations at predetermined times within selected rows of pixels 175.

Still referring to detail view 176 of pixel 175, the photodiode output is additionally coupled to the reset voltage source via transfer gate 195 and amplifier/latch 204. Accordingly, prior to the start of an image capture, a synchronous reset (or "forced reset") of photodiode 191 may be effected by asserting control signals $\phi_{TG}$ and $\phi_{RS}$ (transfer-enable and synchronous-reset) at respective control inputs of gates 195 and 197.

In addition to the analog sampling mode effected by concurrently raising the transfer-enable and enable and sample-enable signals ($\phi_{TG}$ and $\phi_{SEL}$), a digital sampling mode can be effected in one embodiment by raising the sample-enable signal ($\phi_{SEL}$) while holding the transfer-enable signal ($\phi_{TG}$) low. In digital sampling mode, the logic state of the event-memory, '1' or '0', is output onto column read-out line 182 via sample gate 201, thereby enabling column-readout logic 175 to digitally sample the pixel to determine whether an asynchronous reset has occurred during the just-transpired digital sampling interval (i.e., time since prior digital sample or forced reset). In effect, the digital sampling mode enables high-speed, low-power polling for asynchronous reset events within reset-marking pixel 175 without cumbersome analog oversampling.

Still referring to FIG. 4, each column read-out line 182 within pixel array 161 is coupled to a respective read-out circuit 177 within column read-out logic 165, thus allowing an entire row of reset-marking pixels to be digitally sampled or analog-sampled simultaneously in digital or analog read-out operations. In one embodiment, shown in detail view 178, each read-out circuit 177 includes a sample and hold circuit 217 (SH) and analog-to-digital converter 219 (ADC) coupled in series between column read-out line 182 and accumulator line 184 to enable correlated double-sampling of an analog pixel output, an operation described in further detail below. Read-out circuit 177 also includes a binary sense amplifier 215 (SA) coupled between column read-out line 182 and accumulator line 184 to capture and output digital samples of the event-memory state and, at least in some embodiments, to conditionally assert the memory-clear signal ($\phi_{CLR}$) according to the state of captured digital sample value.

The output of each read-out circuit 177 is coupled to a respective accumulator line 184 that is coupled in turn to a column of counter/buffer circuits 179, also referred to herein as "accumulator cells." Each counter/buffer circuit 179 comprises circuitry to count asynchronous reset events detected within a corresponding one of the reset-marking pixels 175, for example, by incrementing a count in response to each logic '1' digital sample read-out from the pixel at the conclusion of a digital sampling interval. Each counter/buffer circuit 179 may also include a buffer element to store a digitized analog sample of the residual pixel voltage acquired at the conclusion of the digital oversampling interval, thus enabling both the pixel-reset tally (i.e., final count of the number of asynchronous reset events for a given exposure interval) and the digitized residual voltage sample to be output via accumulator line 184 (or other signal line) to downstream reconstruction logic or combined by in-situ reconstruction logic (i.e., logic within the accumulator cell) to form a reconstruction value. As shown, the compositing controller outputs a set of control signals 183 via respective control lines to each row of counter/buffer circuits 179, including a count-enable signal ($\phi_{++}$) that enables the corresponding row of counter/buffer circuits to count (i.e., increment an internal count value in response to) reset-indicating digital samples, a load-enable signal ($\phi_{LD}$) to enable the row of counter/buffer circuits to buffer (i.e., load into a register or latch or otherwise store) an incoming digitized analog sample of the pixel residual voltage, and an accumulator-clear signal ($\phi_{AC}$) to clear the contents of the reset count and, optionally, the buffer content, thus restoring the reset count and buffered value to zero following counter/buffer read-out. Compositing controller 171 may cycle the load-enable signal a number of times (i.e., generating a pulse train) to enable an n-bit digitized residual voltage sample to be shifted into the buffer element of a counter/buffer circuit 179, thus effecting a bit-serial transfer of the multi-bit digitized residual voltage sample from ADC 219 to counter-buffer 179 (the latter being shown, for example, at detail view 180) via accumulator line 184.

Compositing controller 171 may also output one or more control signals to enable row-by-row read-out of the reset tally and digitized residue values from accumulator cells 179 (and/or construction of final pixel values in the case of in-situ reconstruction circuitry), thereby enabling those values to be provided in a defined format to an external memory or directly to downstream compositing logic (or reconstruction logic) for production of an array of finished (reconstructed or composited) pixel values and thus a final image frame. Such downstream compositing logic may be implemented, for example, by a programmed digital signal processor or general-purpose processor, dedicated logic or any combination thereof capable of combining the digital tallies and respective digitized residue values (e.g., according to the reconstruction formula shown in FIG. 1) to produced reconstructed pixel values.

In a number of embodiments, such compositing logic is implemented on an integrated-circuit die (IC or "chip") coupled to but separate from an image sensor chip containing reset-marking pixel array 161 and accumulator array 169, in which case a physical signaling interface (PHY) is additionally provided on the image sensor chip to export the composite values within the accumulator array (i.e., reset tally and digitized residue value) to the off-chip compositing logic. Similarly, while accumulator array 169 is generally described herein as being co-located with reset-marking pixel array 161 on an image sensor chip, in all such cases the accumulator array and associated control circuitry may be viewed as part of the compositing logic described in FIG. 1 and may be disposed in whole or part on a separate compositing chip (e.g., that may or may not also include the remainder of the compositing logic described above) or memory device having a PHY coupled to receive individual digital sample values and digitized analog sample values from a counterpart PHY on the image sensor chip. In yet other embodiments, the counting and buffering functions performed by counter/buffer circuits 179 may be split between the image sensor chip and a compositing chip. For example, pixel-reset counting may be performed on the image sensor chip, while digitized residual voltage samples are buffered on the separate compositing chip. Additionally (or alternatively), the pixel-reset counting circuitry itself may be split between two or more ICs, for example, with size-limited counter fragments (e.g., 4-bit counters) implemented on the image sensor chip, and counterpart counter fragments (i.e., each to count the overflow of a respective image sensor counter) implemented on the compositing chip to effect an overall counter corresponding to the sum of the bit-depths of the two counter fragments (e.g., x-bit counters on the image sensor chip which feed respective y-bit counters on the compositing chip to establish a (x+y)-bit total counter depth and thus accommodate a $2^{x+y}$ digital oversampling factor).

In the embodiment of FIG. 4, row scan logic 163 controls digital oversampling and analog sampling (read-out) operations on a row-by-row basis, supplying a respective set of row control signals 181 to each row of pixels 175 within reset-marking pixel array 161. In the implementation shown, the row control signals include the sample-enable, transfer-enable and synchronous-reset signals described above (i.e., $\phi_{SEL}$, $\phi_{TG}$ and $\phi_{RS}$, respectively), as well as a comparator-enable signal ($\phi_{CE}$) which permits the threshold-comparator to be selectively enabled and disabled; an operation discussed in greater detail below. Also, while column read-out logic 165 is shown to assert the memory-clear signal ($\phi_{CLR}$) in the embodiment of FIG. 4 and embodiments described below, in all such cases row scan logic 163 may assert the memory-clear signal instead. More generally, row scan logic 163, column read-out logic 165 and scan control logic 167 may assert any number of control signals instead of or in addition to the control signals described herein, including power-management control signals (e.g., to render the image sensor into and out of a reduced power state), calibration-related control signals, diagnostic-control signals, configuration control signals (e.g., for programming one or more mode-control or configuration values within a programmable register of image sensor 150) and so forth.

FIG. 5 illustrates a more detailed embodiment of amplifier/latching circuit 235 that may be used to implement the event-memory and amplifier functions within reset-marking pixel 175 of FIG. 4 (i.e., as depicted in detail view 176 by "Amp/Latch" 204). As shown, amp/latch 235 is coupled to receive the asynchronous-reset signal ($\delta$), synchronous reset signal ($\phi_{RS}$), and transfer gate output ($\lambda$) at respective inputs and includes a synchronous reset transistor 238, a memory-set transistor 239, a follower amplifier 237, and memory-clear logic 241, the latter implemented by transistors 243 and 245. As with other gates and amplifiers described herein, memory-set transistor 239 and follower amplifier 237 are depicted as field-effect transistors (FETs) as may be implemented, for example, in a CMOS (complementary metal oxide semiconductor) IC fabrication process, though other types of signal-controlled switching elements and amplifier elements may be used in alternative embodiments, including corresponding switching elements and amplifier elements implemented in other types of IC processes.

Referring to the input node (gate terminal) of follower amplifier 237, it can be seen that the node is electrically isolated from ground and supply voltage sources and from the photodiode output when the transfer gate (e.g., gate 195 in FIG. 4), synchronous reset transistor 238, and memory set/reset elements 239 and 241 are switched off (i.e., switched to a non-conducting state or otherwise disabled). Accordingly, when implemented in a fabrication process that yields a sufficient parasitic capacitance, the amplifier input node may be operated as a floating diffusion capacitive memory element or "memory node" that is charged and discharged (and thus set and reset) in response to respective control signals. More specifically, if the asynchronous-reset signal ($\delta$) is raised while the transfer gate, synchronous reset transistor, and memory-clear logic are all switched off (i.e., switched to non-conducting states), memory-set gate 239 is switched on to charge the memory node to a near-$V_{DD}$ potential, thus setting the memory element to a logic '1' that remains even after the asynchronous-reset signal is lowered, and until the memory element is intentionally reset to a logic '0' by switching on the two transistors (243 and 245) that constitute memory-clear logic 241 (i.e., by concurrently asserting the memory-clear and sample-enable signals, $\phi_{CLR}$ and $\phi_{SEL}$, to switchably couple the memory node to ground). Because the memory element is formed at the control input of amplifier 237, the logic '1' or logic '0' state of the memory element may be output to column read-out line 182 via the amplifier and sample gate (i.e., element 201 of FIG. 4) and thus via the same path as the analog pixel sample. That is, by using the input node of amplifier 237 as the memory element at times when that node is not used to read the charge of the photodetector, the amplifier and transfer gate collectively effect a multiplexer for reading out either the event-memory state or the photodiode voltage according to whether the transfer gate is switched off or on, and thus according to the sampling mode of the reset-marking pixel. More generally, by leveraging the floating diffusion input of amplifier 237 as a capacitive storage element and adding a mere three transistors to form memory set and clear logic, the following synergy results:

reset-event memory is automatically set in response to assertion of the asynchronous reset signal (e.g., set to a logic '1' in an edge-triggered latching operation) and thus records the asynchronous reset event;

reset-event memory can be conditionally (e.g., according to whether a logic '1' was sampled) or unconditionally reset following digital read-out;

event-memory can be digitally sampled via the same amplifier and output path used for analog read-out.

In the case of a CMOS logic process, a portion of the diffusion region that forms the FET channel of the transfer gate (element 195 of FIG. 4) is coupled to a gate terminal of follower amplifier 237 and thus constitutes a floating diffusion that serves as the capacitive storage element of the event memory (or event latch). Accordingly, the amplifier input node (and transfer gate output node) is occasionally referred to herein as a floating diffusion node 240 (FD) and as a set/reset node (SR) as indicated at in FIG. 5.

FIG. 6 illustrates an embodiment of a Schmitt trigger circuit 260 that may be used to implement threshold-comparator 193 of FIG. 4. In the implementation shown, Schmitt trigger 260 includes an inverter structure formed by a set of four transistors 261, 263, 265 and 267 coupled in series between a switched voltage source (effected by comparator enable signal, $\phi_{CE}$) and ground. The gate terminals of the transistors are coupled in common to form the Schmitt trigger input (i.e., coupled to the photodiode cathode to receive $V_{DET}$) and the drain-to-source interconnection of transistors 263 and 265 forms the Schmitt trigger output and thus yields the asynchronous reset signal, δ. Feedback transistor 271 is coupled between ground the drain-source interconnection of transistors 265 and 267 with its gate coupled to the Schmitt trigger output, and feedback transistor 269 is coupled between the switched supply voltage (i.e., comparator-enable signal, $\phi_{CE}$) and the drain-source interconnection of transistors 261 and 263, with its gate also coupled to the Schmitt trigger output. The pull-up components of the inverter structure (i.e., transistors 267 and 265) and feedback transistor 271 are implemented by PMOS (P-type MOS) transistors and the pull-down components of the inverter structure (i.e., transistors 261 and 263) and feedback transistor 269 are implemented by NMOS (N-type MOS) transistors. By this arrangement, if the photodiode output, $V_{DET}$, drops below a near-saturation threshold (i.e., $V_{ref}$, a potential inherently established by the design of comparator 260, for example, by adjusting relative sizes of the component transistors to establish a desired PMOS/NMOS size ratio) while the comparator-enable signal is high, transistors 265 and 267 begin conducting, and transistors 261 and 263 tend toward a non-conducting state, thereby causing the comparator output voltage (i.e., the asynchronous-reset signal, δ, at the Schmitt trigger output), to rise. The rising comparator output causes feedback transistor 269 to begin conducting, raising the voltage at the source-drain interconnect between transistors 261 and 269 and thus accelerating the transition of transistor 263 into a non-conducting state. Accordingly, feedback transistor 269 effects a positive feedback in support of the rising comparator output, snapping the asynchronous reset signal high when the photodiode output crosses the $V_{ref}$ threshold. During the ensuing asynchronous reset operation, as the photodiode voltage approaches the reset voltage, $V_{rst}$, transistors 261 and 263 begin to conduct and transistors 265 and 269 transition toward a non-conducting state, thus lowering the voltage at the comparator output. The falling comparator output causes feedback transistor 271 to begin conducting, lowering the voltage at the source-drain interconnect between transistors 265 and 267, thereby accelerating the transition of transistor 265 into a non-conducting state. Thus, feedback transistor 271 provides a positive feedback path to reinforce the falling comparator output, rapidly slewing the asynchronous reset signal to a low state after the photodiode has been reset.

The various transistors used to implement the Schmitt trigger shown in FIG. 6 may be sized to provide a desired hysteresis between thresholds that trigger assertion and deassertion of the asynchronous reset signal (i.e., the near-saturation threshold, Vref, and the threshold at which the asynchronous reset signal goes low), and to establish the levels of the thresholds themselves with respect to the ground and switched supply voltages. Also, a number of other Schmitt trigger circuit configurations may be used in alternative embodiments, and, more generally, a number of alternative comparator circuits may be used, including comparator circuits that have more or fewer transistors than the Schmitt trigger shown in FIG. 6 and/or that receive one or more globally distributed (or row-distributed or column-distributed) reference voltages to establish thresholds at which the comparator output transitions.

FIG. 7 illustrates an embodiment of a sense amplifier 280 that may be used to implement sense amplifier 215 within the exemplary read-out circuit 177 of FIG. 4. As shown, sense amplifier 215 includes a threshold-comparator 281, latch element 283 and AND logic gate 285. Threshold-comparator 281 is coupled to the column read-out line 182 for a corresponding column of reset-marking pixels and generates a logic high or low output according to whether the voltage level of the read-out line is above or below an internally-established or remotely sourced binary-sense threshold ($V_S$). In one embodiment, the binary-sense threshold is set at the mid-potential between logic '1' and logic '0' voltage levels driven onto the column read-out line during digital sampling operations, so that the comparator serves to amplify (or restore) the digital read-out voltage to a logic-level signal. Latch element 283 latches the output of threshold-comparator 281 in response to assertion of a latch-enable signal, and then AND gate 285 asserts memory-clear signal, $\phi_{CLR}$, when enabled by a conditional-clear signal, $\phi_{CC}$, and on the condition that the digital sample captured within latch element 283 is a logic '1' (i.e., indicating that the event-memory within the pixel being sampled is set and needs to be cleared).

Note that, while the memory-clear signal may alternatively be asserted following each digital sampling operation without regard to the digital sample value (i.e., unconditionally clearing the event memory within the selected pixel), an asynchronous reset that occurs immediately after a logic '0' digital sample is read-out (i.e., no asynchronous reset event) could be masked by the unconditional memory-clear signal assertion and event-memory reset that results therefrom. Conditionally asserting the memory-clear signal (i.e., asserting $\phi_{CLR}$ only when the digital sample latched by sense amplifier 280 indicates detection of an asynchronous reset event within the selected pixel) avoids such a conflict. Alternately, an unconditional clearing operation can be combined with synchronous deassertion of the comparator-enable signal, $\phi_{CE}$, to prevent an asynchronous reset event during digital readout. In such an embodiment, the comparator would reset when re-enabled, albeit with a potential small loss of integration charge (beyond that required to trigger the Schmitt trigger) received during the deassertion time.

In one embodiment, shown by the timing waveforms in FIG. 7, the latch-enable signal and conditional-clear signal ($\phi_{LE}$ and $\phi_{CC}$) are asserted successively by a scan controller (e.g., element 165 of FIG. 4) concurrently with assertion of the sample-enable signal ($\phi_{SEL}$) corresponding to a row of pixels within the reset-marking pixel array. To control the overall image sensor operation, the scan controller issues a row-scan clock to the row scan logic (element 163 of FIG. 4) to enable row-by-row digital sampling operations (i.e., asserting the sample-enable signal for successive row of pixels in the reset-marking pixel array) and pulses the latch-enable signal and conditional-clear signal during each sample-enable signal assertion (e.g., at the times shown in FIG. 7). By this operation, digital samples from each successively selected row of pixels is captured within the bank of column read-out circuits (and more specifically within latch elements 283 of the bank sense amplifiers 280) and the event memory within each reset-marking pixel of the selected row of pixels is conditionally cleared (i.e., cleared if not already in a logic '0' state).

FIG. 8 illustrates an embodiment of a sample-and-hold circuit 300 that may be used to implement sample-and-hold element 217 of FIG. 4 and thus support correlated double-sampling within image sensor 150. Assuming, for example, that the amplifier/latch 204 shown in FIG. 4 is implemented by the circuit arrangement shown in FIG. 5, the floating diffusion node 240 may be at an unknown voltage level prior to executing an analog sampling operation, and thus represents a source of noise. In one embodiment, the sample-and-hold circuit serves to capture the analog voltage level of the floating diffusion before and after the transfer gate (element 195 of FIG. 4) is switched on to enable the photodiode voltage to be sampled, and then to output the difference between the two analog voltages to an ADC (e.g., element 219 of FIG. 4). More specifically, during a correlated double-sampling operation (i.e., while the sample-enable signal for a selected row of pixels is asserted), the scan-controller (i.e., element 167 of FIG. 4) initially pulses a reset-read signal ($\phi_R$) to switch on transistor 301 and thereby enable the voltage level conveyed via the column read-out line 182 to charge a reset-measurement capacitor ("$C_R$") to a voltage level corresponding to that on the floating diffusion node of the corresponding pixel. Shortly after conclusion of the reset-read pulse, the row scan logic (i.e., element 163 of FIG. 4) raises the transfer-enable signal to switchably couple the cathode of the photodiode to the floating diffusion node (i.e., gate of amplifier 237 of FIG. 5), thereby driving a signal level corresponding to the photodiode transferred charge (in addition to the reset voltage, and any reset noise, that had been present on the floating diffusion) onto the column read-out line. At this point, the scan controller pulses a signal-read signal ($\phi_S$) to switch on transistor 303 long enough for the photodiode signal level (plus reset signal) to be captured on a signal-measurement capacitor ("$C_S$"). Finally, after the conclusion of the signal-read operation (i.e., pulsing of signal-read signal $\phi_S$), the scan controller asserts a difference-enable signal ($\phi_Y$) to enable the reset measurement and signal measurement recorded on capacitive elements $C_R$ and $C_S$ to be supplied to respective inputs of a differential amplifier 309. Differential amplifier 309, in response, generates an output signal that corresponds to a difference between the reset+noise and signal+reset+noise measurements and thus a voltage that corresponds to the photodiode voltage without contribution from the floating-diffusion noise. This noise-compensated or "correlated" photodiode voltage measurement is supplied to the ADC (i.e., element 219 of FIG. 4), which is then enabled by the scan controller to perform an analog-to-digital conversion and thus yield a digitized sample of the noise-compensated analog photodiode voltage. Note that the capacitive elements shown in FIG. 8 may alternatively be disposed in series between transistor pairs 301/305 and 303/307 (i.e., instead of in parallel with the drain-to-source connection), and more generally that numerous other sample and hold circuit designs may be used in alternative embodiments.

FIG. 9 illustrates an embodiment of an accumulator cell 310 that may be used to implement each of the counter/buffer circuits 179 within the accumulator array shown in FIG. 4. As shown, accumulator cell 310 includes an analog sample register 311, digital sample counter 313, output multiplexer 315 and output serializer 317. The analog sample register 311 is provided to buffer an n-bit digitized residual voltage sample (e.g., output from ADC 219 of FIG. 4) and may be serially loaded with a bit train (i.e., supplied via accumulator line 184) in response to a sequence of load signal ($\phi_{LD}$) pulses. The digital sample counter is provided to tally the number of logic '1' (i.e., reset-indicating) digital samples read-out in a given exposure interval and is thus incremented in response to assertion of count-enable signal, $\phi_{++}$ when the digital sample conveyed via accumulator line 184 indicates detection of a reset event. Accumulator clear signal, $\phi_{AC}$, may be asserted at the conclusion of a given image capture operation to clear both the digital sample counter and the analog sample register in preparation for a subsequent image capture.

In the embodiment of FIG. 9, the outputs of analog sample register 311 and digital sample counter 313 are selected via multiplexer 315 for read-out one after another, with the parallel output of each being converted to a serial bit stream within serializer 317 (e.g., for bit serial transmission via a PHY). In alternative embodiments, particularly where compositing logic for reconstructing pixel values from the contents of register 311 and counter 313 are disposed on the same IC as the accumulator array, the register and counter outputs may be read-out simultaneously instead of one after another and/or the outputs may be conveyed as parallel groups of bits to downstream compositing logic instead of being serialized.

FIG. 10 is a timing diagram illustrating an exemplary sampling sequence within the reset-marking pixel array of FIG. 4, together with an example of a control signal sequence with respect to one pixel row. As shown, each image frame period begins with a forced reset of the pixel array, followed by multiple digital sampling intervals and then an analog read-out before the forced reset is repeated in preparation for the next image frame. Thus, the exposure interval for each image frame extends from the conclusion of the forced-reset to the capture of the analog photodiode voltage within the sample and hold circuit. Though depicted as occurring simultaneously throughout the pixel array, forced-reset may be effected sequentially in a "rolling shutter" mode with respect to individual pixel rows (i.e., resetting one pixel row through assertion of the $\phi_{RS}$ and $\phi_{TG}$ signals for that row before executing the forced-reset operation for the next row), with the time between row reset operations matching (or less than) the time between pixel row read-out operations during the ensuing digital sampling intervals. Thus, operations within the pixel array are staggered with respect to individual rows of pixels, sequencing through each pixel row in order with the row-to-row delay (i.e., sequencing rate) being established, for example, by the duration of the digital sampling operation to ensure a uniform sample-to-sample exposure time within each pixel row.

During each digital sampling interval, respective rows of pixels are digitally sampled and conditionally cleared one after another. An exemplary control signal sequence relating to this operation are depicted in greater detail with respect to the $N^{th}$ pixel row, together with an exemplary photodiode voltage waveform corresponding to a pixel in that row. As shown, the comparator-enable signal ($\phi_{CE}$) remains asserted for the duration of the digital oversampling period (i.e., for the $N_t$ digital sample intervals) before being switched off during the analog read-out operation. At the conclusion of each of the $N_t$ digital sampling intervals, the sample-enable signal for the subject pixel row is raised to execute a digital read-out and conditional latch reset (e.g., through assertion of latch-enable signal $\phi_{LE}$ and conditional-clear signal, $\phi_{CC}$ as shown in FIG. 7). In the example shown, the photodiode voltage (i.e., for a given pixel within row N) remains above the near-saturation threshold ($V_{ref}$) during the initial digital read-out so that a logic '0' value is conveyed via the column read-out line and captured within the sense amplifier. Accordingly, no memory clearing operation occurs (i.e., in a sense amplifier implemented as shown in FIG. 7, the output of logic gate 295 remains low when $\phi_{CC}$ is asserted). Similarly, at the conclusion of the second digital sampling interval, the photodiode voltage, though reduced, still remains above the near-saturation threshold, so that another logic '0' digital sample is captured and the memory-clear signal ($\phi_{CLR}$) remains unasserted. During the third digital sampling interval, the photodiode voltage falls to the near-saturation threshold, so that the threshold-comparator asserts the asynchronous reset signal ("Async-Reset") as shown at 321, latching a logic '1' signal level at the floating diffusion node ("FD(SR)") as shown at 323 and thus driving a logic '1' on to the column read-out line during the ensuing digital readout. The logic '1' sample is latched within the sense amplifier and thus enables a conditional clear operation within the subject pixel, as signified by the solid $\phi_{CLR}$ pulse 325 and the resulting reset of the floating diffusion node shown at 327. Note that the asynchronous reset event itself permits continued photo-detection within the subject pixel (as shown by the declining photodiode voltage at 329) even before the reset event itself is detected by the column read-out logic. Accordingly, asynchronously resetting the pixel while at the same time marking (or recording or signifying occurrence of) the reset event within the pixel's event memory enables the pixel to continue to sense and record photon strikes (i.e., no pixel saturation occurs as in synchronous-reset approaches) without requiring slow and power-consuming analog oversampling to detect the asynchronous reset event. Continuing with FIG. 10, another pixel reset occurs within the subject pixel shortly after the digital sampling operation in the penultimate digital sampling interval, resulting in assertion of the asynchronous reset signal relatively early in the final digital sampling period, followed eventually by a logic '1' read-out (and assertion of the memory clear signal) at the conclusion of the final digital sampling period.

Still referring to FIG. 10, prior to generating an analog sample of the residual voltage, the comparator-enable signal is lowered as shown at 331 to disable the threshold-comparator, thus ensuring that no asynchronous reset event occurs during the analog sampling. In one embodiment, a number of additional digital samples (333) and analog samples of the floating diffusion state are captured just prior to and just after the threshold-comparator shutoff to determine (i) whether an asynchronous reset occurred between the time of the final digital sample and the threshold-comparator shut-off and (ii) whether an asynchronous reset event occurred, in whole or part, during the asynchronous shutoff, both determinations serving to ensure that any complete asynchronous reset events are reflected in the final reset-event tally and that no partial asynchronous reset event occurred amidst the comparator shutoff operation. These analog-read-out-qualifying operations are discussed in further detail below.

Reflecting on the potential for conflict between digital read-out and asynchronous reset, FIG. 10 illustrates that a steady photon flux which triggers asynchronous reset events exactly at the digital sampling rate and which occur in synchronism (conflict) with the digital sampling operations could result in a non-counted asynchronous reset in every other digital sampling period. That is, while a digital read-out value of N is expected, the actual digital read-out value may be N/2. While this special case is unlikely and may simply be ignored, an alternative in view of the additional sampling time overhead available by virtue of the low-overhead digital sampling operation is simply to double the digital sampling rate to 2N, where N is the minimum desired digital oversampling. Under that arrangement, even if the unlikely synchronistic conflict arises, the resulting digital sampling rate will still meet the desired minimum value, N.

Figure 11:
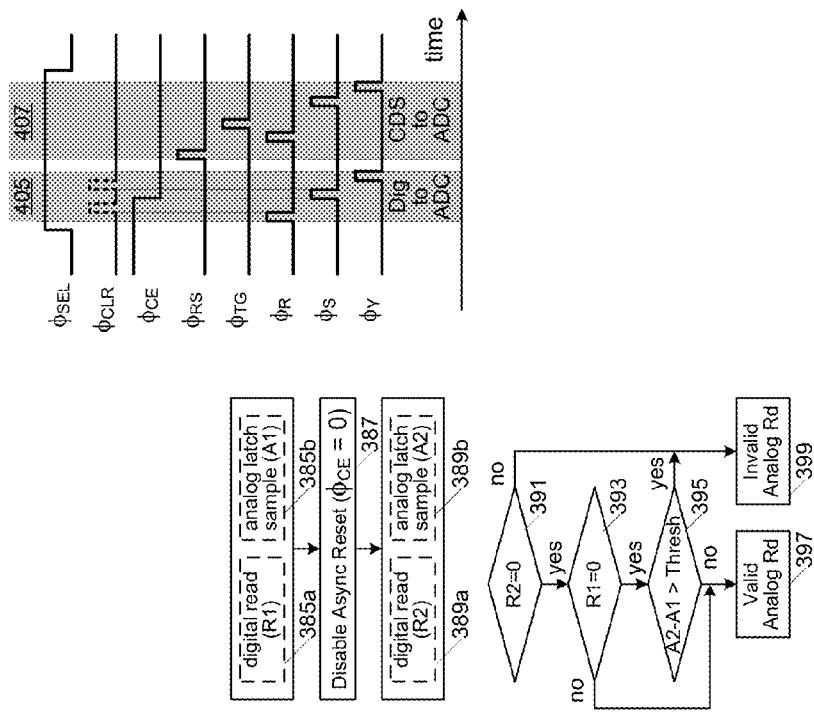
FIG. 11 illustrates an exemplary flow diagram of the image-sensor read-out sequence shown in FIG. 10.

FIG. 11 illustrates an exemplary flow diagram of the image-sensor read-out sequence shown in FIG. 10. At 351, a forced-reset operation is executed to precharge the reset-marking pixels of each row to the reset potential ($V_{rst}$), and row index 'i' and digital sample index 'n' are reset to zero. As explained above, the forced read-out operation may be executed in row-sequenced order to ensure that all pixel rows are exposed for uniform (but temporally staggered) intervals prior to each sampling operation. At 353, after an optional delay at 352, a digital read is executed to obtain digital samples of the reset-marking pixels within row 'i', incrementing the sample accumulators for row 'i' as necessary. As shown at detail view 354, this may be accomplished generally as described in reference to FIG. 7 through assertion of the row 'i' sample-enable signal ($\phi_{SEL(i)}$) to enable the row of pixels to drive signals representative of respective event-memory states onto the column bit lines (i.e., according to the logic states of their respective floating diffusion nodes), followed by assertion of latch enable signal $\phi_{LE}$ to latch digital samples of the event-memory states within respective sense amplifiers of the column read-out logic. After the digital samples are latched within the sense amplifier bank, the conditional-clear signal $\phi_{CC}$ is asserted to enable corresponding assertion of the memory-clear signals (not specifically shown) for those pixels that yielded a logic '1' (i.e., marking an asynchronous reset event) digital sample. As shown, a count-enable signal, $\phi_{++(i)}$, may also be asserted following the sense-amplifier latching operation to enable the digital samples to be counted within respective counters of the accumulator array.

After the row-i digital read, the row index ('i') is incremented at 355 and, if not beyond the index of the last pixel row (i.e., negative determination at 357), then the digital read operation is repeated at 353 for the next pixel row. Note that while a progressive (linear) scan through the rows of the reset-marking pixel array is effected by this operation, other sequencing patterns may be employed in alternative embodiments or configurations (e.g., interleaving even and odd pixel rows, converging to center or periphery, etc.). Whatever the scan pattern, after the last pixel row has been digitally sampled within a given sampling interval (i.e., affirmative determination at 357), the row index is reset and the digital sample index ('n') is incremented at 359. If the digital sample index is not beyond the index of the final digital sampling interval (i.e., negative determination at 361), an optional delay is imposed at 362 to establish a desired digital sampling rate, followed by repetition of the digital row-scan sequence at 353-359 for a subsequent digital sampling period. Note that the digital oversampling achieved by iteration of the operations at 353-359 can be linear (i.e., uniform delay from sample to sample with respect to each row of the array) or non-linear (e.g., exponential or binary shortening or lengthening of the sample-to-sample delay with respect to a given row of the array—changing the delay at 362 at each new value of 'n' or upon reaching specific values of 'n'), with the latter requiring more complex image reconstruction to account for the non-uniform sampling interval.

After the digital row-scan sequence corresponding to the last digital sample period has been executed (i.e., affirmative determination at 361), an analog row-scan sequence is executed by executing an analog read operation for row i at 363 and incrementing the row index at 365 until an analog read-out is executed with respect to the last pixel row in the sequence (i.e., affirmative determination at 367).

In the embodiment of FIG. 11, each analog read-out operation at 363 includes the exemplary sub-operations shown in detail view 364, including a switchover from digital to analog sampling modes ("Digital to ADC" 375), a correlated double-sample analog read operation (377), and a qualification of the analog read (379) based on information obtained in the digital-to-ADC switchover. In the example shown, the digital to ADC switchover operation at 375 includes shutting down the threshold-comparator within the subject pixel row (i.e., to prevent a disruptive asynchronous reset during the analog sample acquisition) together with acquiring digital and analog samples of the reset-event memory elements within the row of pixels to determine whether an asynchronous reset or partial asynchronous reset occurred in the intervening interval between the final digital sampling operation and the threshold-comparator shutdown. More specifically, in the exemplary detail view shown at 376, a digital read of the floating diffusion node (including a conditional clear and reset-event counting operation as in the digital read operations executed as part of the digital oversampling interval) is executed at 385a to obtain a digital qualification bit, R1. At the same time or approximately the same time, an analog read of the floating diffusion node is executed at 385b to acquire an analog sample, A1, of the floating diffusion. Note that the analog sample of the floating diffusion is executed in generally the same manner as the capture of the floating diffusion noise in a correlated double sampling operation (i.e., without switching on the transfer gate so that the floating diffusion is electrically decoupled from the photodiode), and in fact may be captured, for example, within capacitor "$C_R$" of FIG. 8. After completing the digital and analog samples of the floating diffusion node (e.g., the node shown at 240 in FIG. 5), the comparator-enable signal is lowered at 387 to disable the threshold-comparator, followed by a repeated digital read (including conditional reset and reset-event count increment) and analog sample of the floating diffusion at 389a and 389b to acquire values R2 and A2, respectively. As explained below, the difference between the two analog samples may be evaluated to qualify the ensuing CDS analog read-out, so the A2 value may be captured within a CDS circuit (e.g., on capacitor $C_S$ of FIG. 8) in a manner that enables a differential of the A2 and A1 samples to be evaluated.

Still referring to FIG. 11, the digital and analog sample pairs acquired during the digital-to-ADC switchover (i.e., R1/R2 and A1/A2) are used to determine whether an asynchronous reset occurred in the interval prior to or during the comparator shutdown operation and thus to qualify the analog value obtained during the correlated-double-sampled (CDS) analog read operation at 377. In one embodiment, shown for example in detail view 380, if the post-comparator-shutoff digital sample (R2) indicates that an asynchronous reset event occurred during the comparator shutoff operation (i.e., R2=1 and thus a negative determination at 391), then the asynchronous reset event occurred immediately prior to the CDS analog read operation and at a time that makes it difficult to ensure that the pixel was fully reset. Accordingly, due to the uncertainty with respect to the photodiode reset operation, the analog value read-out in the CDS analog read operation at 377 is presumed to be invalid and may be flagged as such or forced to a predetermined value (e.g., zero) at 399 to reflect that presumption (or assumption or determination).

If the R2 value does not indicate detection of an asynchronous reset event (i.e., affirmative determination at 391), then the pre-comparator-shutoff digital sample (R1) is evaluated at 393 to determine whether an asynchronous reset occurred in the interval since the final digital read and the start of the digital-to-ADC switchover operation. If no such asynchronous reset occurred (i.e., R1=0), then the analog value acquired in the CDS analog read at 377 is deemed to be valid (and may be flagged or otherwise signified as such at 397) and is thus latched within a corresponding buffer circuit of the accumulator array (or directly combined with the digital samples in a pixel-value reconstruction operation). If an asynchronous reset did occur in the interval since the final digital read and the start of the digital-to-ADC switchover (i.e., R1=1), then the difference between the two analog samples of the floating diffusion (i.e., A2−A1) is evaluated at 395 to determine whether A2 exceeds A1 by more than a "partial-reset" threshold, with an affirmative determination indicating that an asynchronous reset event was in progress, but not completed prior to the comparator shutdown at 387. That is, a partial reset occurred so that the analog value captured in the ensuing CDS analog read at 377 is invalid. By contrast, if A2 does not exceed A1 by more than the partial-reset threshold (negative determination at 396), the logic '0' R1 and R2 values are deemed to correctly reflect the determination that no asynchronous reset (or partial reset) occurred, so that the analog value captured in the ensuing CDS analog read is deemed to be valid and may be flagged as such at 397.

Figure 12:
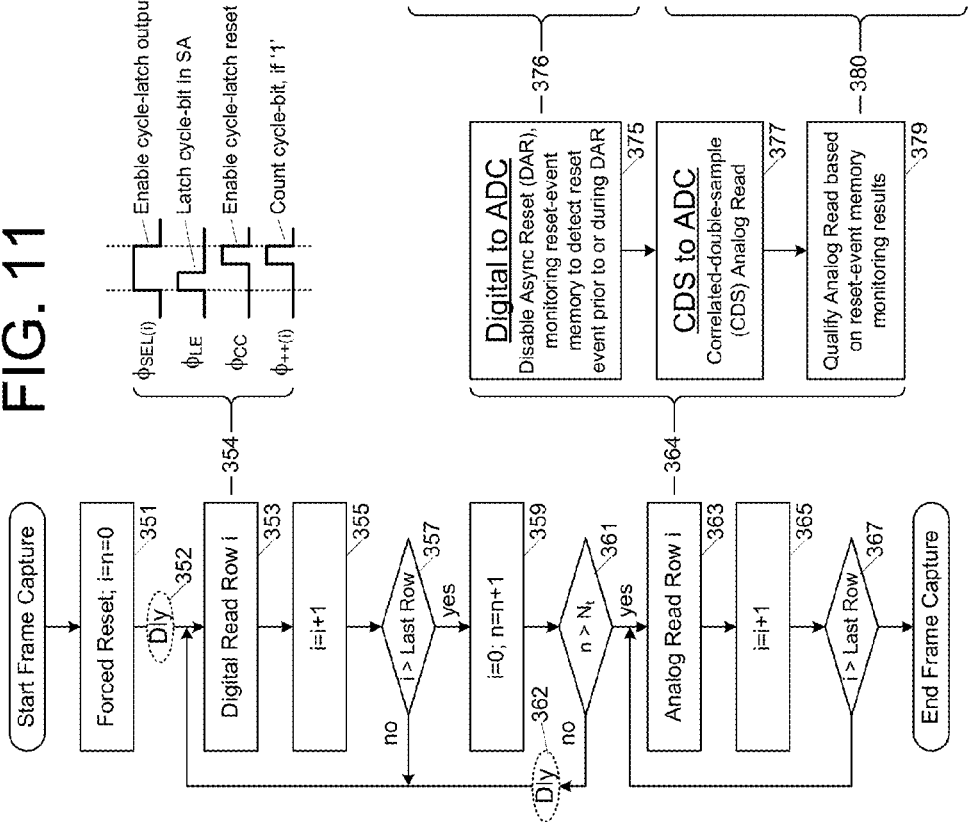
FIG. 12 illustrates an exemplary control signal sequence corresponding to an analog read operation within selected reset-marking pixel of FIG. 4.

FIG. 12 illustrates an exemplary control signal sequence corresponding to an analog read operation within selected reset-marking pixel of FIG. 4, including the digital-to-ADC and CDS analog read operations described in reference to FIG. 11. As shown, the sample-enable signal ($\phi_{SEL}$) for the subject pixel is asserted throughout the digital-to-ADC and CDS analog read-out operations (405 and 407, respectively). Though not specifically shown, the latch enable signal ($\phi_{LE}$), conditional-clear signal ($\phi_{CC}$) and count-enable signal ($\phi_{CNT}$) are asserted to carry out a digital read operation (R1) both before and after lowering comparator-enable signal $\phi_{CE}$, thus acquiring digital samples R1 and R2 (conditionally asserting $\phi_{CLR}$ following each sample acquisition) and enabling the reset-event count to be incremented as many as two additional times. CDS control signals $\phi_R$ and $\phi_S$ are asserted concurrently with the digital sample acquisition to capture the analog level of the floating diffusion node, for example, within respective capacitive storage elements $C_R$ and $C_S$ of FIG. 8. Note that the acquisition time for the analog floating diffusion node samples may be longer than the digital sample acquisition time, so that the pulses of the $\phi_R$ and $\phi_S$ may be wider (longer in duration) than those shown. In any case, shortly after acquisition of the pre- and post-comparator-shutdown analog samples of the floating diffusion node (i.e., A1 and A2, respectively), control signal $\phi_Y$ is asserted to enable a difference circuit (e.g., differential amplifier 309 of FIG. 8 or another analog difference circuit) to output the difference between A2 and A1 to the input of the ADC, followed by an ADC operation to generate a digitized measure of the differential value (i.e., ADC(A2−A1)). Note that A2 and A1 may alternatively be captured and digitized one after another with the resulting digital value subtracted from one another to produce the differential value, A2−A1, or the absolute value of the difference, |A2−A1|. Also, instead of being digitized and compared with a digital threshold, the analog difference between A2 and A1 may be compared with an analog partial-reset threshold.

Still referring to FIG. 12, after the digital to ADC operation is completed, a forced-reset of the floating diffusion node is performed by pulsing the $\phi_{RS}$ signal and thereafter capturing analog measures of the floating diffusion node (i.e., by pulsing $\phi_R$) and the photodiode voltage (by asserting $\phi_{TG}$ and then pulsing $\phi_S$) within respective capacitive storage elements. Signal $\phi_Y$ is then pulsed to enable generation of the correlated analog measurement, followed digitization of the correlated analog measurement within the ADC.

Returning briefly to FIG. 11, the valid/invalid status of the analog read-out value (i.e., the digitized representation of the residual photodiode voltage) may be explicitly signified, for example, by setting or clearing a "valid" bit within the corresponding buffer element of the accumulator array (i.e., such bit constituting the N+1th bit of an N+1 bit register used to buffer the N-bit analog read-out value). Alternatively, because the determination that the analog read-out value is invalid is in essence a determination that an asynchronous reset or partial asynchronous reset occurred immediately prior to acquisition of the analog read-out value, the analog read-out value may be cleared (e.g., to zero) to reflect the expected analog read-out following an asynchronous reset (i.e., a value corresponding to the reset voltage). Also, in the case where the asynchronous reset is indicated only by the analog samples of the floating diffusion node (i.e., a partial reset) and not by the digital samples R1 and R2 (i.e., affirmative determination at 395), the reset count may be incremented to reflect the asynchronous reset. Further, the number of digital samples acquired during the digital over-sampling period may be backed off from a fully saturated digital representation to avoid overflow due to the counting of reset events signaled by R1 and/or R2. For example, if a 10-bit reset counter is provided within each of the counter/buffer circuits of an accumulator array, the number of digital samples per exposure interval (i.e., $N_t$) may be set to $2^{10}-2$ to avoid counter overflow in the event that an asynchronous reset is detected in each digital sample acquired during an exposure interval, including R1 and R2. Alternatively, each of the counter/buffer circuits may saturate, and thus stop counting, at the maximum value (e.g., $2^{10}-1$).

Returning briefly to FIGS. 4 and 5, a reset-marking pixel array formed by the transistor elements shown may be viewed as containing a four-transistor (4T) active pixel that includes the photodiode 191, transfer gate 195, synchronous-reset gate 238, amplifier transistor 237 and sample gate 201. As discussed, after adding the threshold-comparator 193 and asynchronous reset gate 199, a set/reset latching element may be effected through relatively little additional circuitry (i.e., a mere three transistors in one embodiment), by leveraging the floating diffusion node that exists as part of the 4T active pixel.

FIG. 13 illustrates an alternative embodiment of a reset-marking pixel 430 formed by a 3T active pixel in conjunction with asynchronous reset circuitry, and a settable/resettable event memory (collectively referred to herein as a 3T-AP reset-marking pixel). The 3T active pixel includes photodiode 431 (or other photosensitive element) together with reset gate 443, amplifier transistor 437 and sample gate 441, and the asynchronous reset circuitry is implemented, in part, by near-threshold-comparator 435 (shown as a Schmitt trigger, "ST", though other comparator circuits may be used as discussed above).

Because the 3T active pixel lacks a floating diffusion node that may be leveraged to form an event memory element, a dedicated floating diffusion node 446 is implemented between memory-set gate 445 and memory read-out amplifier 447, the latter being coupled between the sample gate and a supply voltage node ($V_{DD}$). Further, because separate amplifiers 437 and 447 are provided to generate digital and analog sample outputs, a multiplexing transistor 439 is coupled between the output of analog-signal amplifier 437 and sample gate 441 to enable the amplified analog output to be switchably coupled to and de-coupled from the sample gate. More specifically, a mode-control signal ($\phi_{mode}$) is lowered to effect a digital sampling mode in which multiplexing transistor 439 is switched off to isolate the analog output amplifier from the sample gate, thus establishing an unfettered path for memory read-out amplifier 447 to drive column read-out line 182 (i.e., according the state of floating diffusion 446) when the sample-enable signal is asserted. The mode-control signal is raised to effect an analog sampling mode (e.g., after ensuring that the event memory formed by floating diffusion node 446 is reset so that memory read-out amplifier 447 is in an open-drain state) in which the output of the analog signal amplifier is coupled to the column bit line via multiplexer gate 439 and sample gate 441.

The mode-control signal is additionally supplied to the input of a reset-signal multiplexer 455, formed by the transistors 457 and transistor 459 (implemented by PMOS and NMOS transistors, respectively), that forwards either the asynchronous reset signal from threshold-comparator 435 or synchronous-reset signal ($\phi_{RS}$) to the gate terminal of reset transistor 443 depending on whether the mode-control signal is low (digital sampling mode) or high (analog sampling mode). Thus, in digital sampling mode, a high-going output from the threshold comparator (signaling that the near-saturation threshold has been reached or exceeded) is passed via multiplexer 455 to the gate of reset transistor 443, thereby switching on the reset transistor to effect an asynchronous (i.e., threshold-exceedance-triggered) reset of the photodiode. To effect a forced-reset, the row scan controller (not shown) concurrently raises the mode-control signal ($\phi_{mode}$) and the synchronous-reset signal ($\phi_{RS}$) to switch on reset transistor 443 and thus force a photodiode reset, regardless of the photodiode voltage.

Still referring to FIG. 13, reset-marking pixel 430 additionally includes memory-clear logic 450 formed by gates 451 and 453 (controlled by the sample-enable signal and memory-clear signal, $\phi_{SEL}$ and $\phi_{CLR}$, respectively) coupled in series between floating diffusion node 446 and ground. As in the embodiment of FIG. 4, the memory-clear signal may be conditionally asserted according to the state of a digital sample latched within read-out circuit 177, thus effecting a memory clear operation within a sample-enable-selected pixel only when the reset-event memory of pixel 430 has been set.

In the embodiment shown, the threshold-comparator remains enabled whenever the pixel array is powered, thus avoiding the need for an additional control signal (and signal routing) to selectively shutoff the threshold comparator 435.

More specifically, instead of shutting the threshold-comparator off during an analog read-out operation, the high state of the mode-control signal (i.e., raised to establish the analog sampling mode in which multiplexing transistor 439 is switched on to couple the output of analog amplifier 437 to column read-out line 182 via sample gate 441) switches off transistor 457 within multiplexer 455, thereby decoupling the threshold-comparator output from reset gate 443. Consequently, though the threshold-comparator remains enabled during the analog read-out operation (and is capable of setting a logic '1' at floating diffusion node 446), the photodiode output remains undisturbed despite assertion of an asynchronous reset signal (i.e., high output from threshold comparator 435). The analog read-out sequence and operations that may be executed to detect untimely asynchronous reset signal assertion are discussed in further detail below.

FIG. 14 is a timing diagram illustrating an exemplary sampling sequence within an array of the 3T-AP reset-marking pixels shown in FIG. 13, together with an example of a control signal sequence with respect to one pixel row. As in the timing diagram of FIG. 10, each image frame period begins with a forced reset of the pixel array, followed by a sequence of digital sampling intervals before concluding with an analog read-out of the residual photodiode voltage. As shown, the mode-control signal ($\phi_{mode}$) is held low throughout the digital oversampling interval, while the signal states of the sample-enable, asynchronous-reset, and memory-clear signals and the state of read-out line are essentially the same as shown in FIG. 10.

During an analog read-out operation, sample-enable signal $\phi_{SEL}$ is raised long enough to capture not only a correlated-double-sample ADC value, but also a pair of digital read-outs; one just before the ADC operation and one just after, referred to herein as pre-ADC and post-ADC digital reads, respectively. As shown at 461, mode-control signal $\phi_{mode}$ is raised following the pre-ADC digital read and lowered prior to the post-ADC digital read to establish an analog sampling mode within the selected pixel row and thus enable the analog read-out. As FIG. 15 illustrates, the pre-ADC digital read (503), CDS to ADC operation (505) and post-ADC digital read (507) are followed by a qualification operation in which the analog read-out value is qualified as valid or invalid. More specifically, the pre-ADC digital read is executed just prior to raising the mode-control signal to determine whether the asynchronous reset signal has occurred since the time of the last digital sample of the digital oversampling period and, if so, to reset the floating diffusion node 446 (thus avoiding interference with the ensuing analog read-out) and counting the reset event. The post-ADC digital read is executed immediately after lowering the mode-control signal and thus just after executing the CDS analog read-out. If the digital sample (Rt) obtained in the post-ADC digital read-out indicates an asynchronous reset event, then the photodiode output exceeded the near-saturation threshold sometime between the pre- and post-ADC digital read-outs (while the pixel was in the reset-disabled, analog sampling mode) and thus may have exceeded the threshold (without triggering an asynchronous reset) or even saturated prior to or during the analog sampling operation. Accordingly, because a logic high post-ADC digital sample indicates that the photodiode may have saturated (and that additional noise may have been injected into the analog sample by virtue of switching on transistor 445), the analog read-out value is invalidated at 513 following an affirmative determination at 509. By contrast, if the post-ADC digital read indicates that no asynchronous reset has occurred since the pre-ADC digital read (i.e., negative determination at 509), the analog read-out is validated at 511. As discussed above, an invalidated analog read-out may be explicitly flagged by clearing/setting a bit within the counter/buffer circuit for the pixel in question, or implicitly effected by setting the analog read-out value to a predetermined value (e.g., zero).

FIG. 16 illustrates an exemplary control signal sequence corresponding to an analog read operation within the exemplary reset-marking pixel of FIG. 13, including the pre-ADC digital read, CDS analog read-out (CDS to ADC) and post-ADC digital read operations described in reference to FIG. 15. As shown, the sample-enable signal ($\phi_{SEL}$) for the subject pixel is asserted throughout the analog read-out and pre- and post-ADC digital reads. Though not specifically shown, the latch enable signal ($\phi_{LE}$), conditional-clear signal ($\phi_{CC}$) and count-enable signal ($\phi_{++}$) are asserted to carry out each of the pre- and post-digital reads, thus acquiring digital samples (conditionally asserting $\phi_{CLR}$ following each digital sample acquisition) and enabling the reset-event count to be incremented as many as two additional times. As shown, the mode-control signal ($\phi_{mode}$) is raised for the duration of the CDS to ADC operation, with CDS control signal $\phi_R$, transfer-gate enable signal $\phi_{TG}$ and then CDS control signals $\phi_S$ and $\phi_Y$ being asserted in sequence to deliver a correlated double-sample of the photodiode voltage to the ADC for digitization. After the CDS analog read-out is digitized (e.g., shortly after $\phi_Y$ is lowered), the mode-control signal is lowered in preparation for the post-ADC digital read, including a conditional memory-clear as shown by the dashed $\phi_{CLR}$ pulse.

As discussed briefly in reference to FIG. 1, a reconstructed output value for a given reset-marking pixel may be generated by multiplying the number of asynchronous reset events detected in a given exposure interval by the reset differential (i.e., digitized value of the difference between the pixel reset voltage and near-saturation threshold voltage) and then adding the digitized value of the residual photodiode voltage obtained in an analog read-out. In an embodiment in which the near-saturation threshold and/or pixel-reset voltages tend to vary from pixel to pixel (e.g., due to slight differences in the operation of respective threshold-comparators) or, even if uniform from pixel to pixel, such voltages drift with changes in temperature and voltage, it may be desirable to calibrate the difference between those voltages (i.e., the reset differential) on a per-pixel basis. FIG. 17 illustrates an exemplary sequence of operations that may be carried out to perform per-pixel calibration of the reset differential, $V_d$. Starting at 541, the scan controller (e.g., element 167 of FIG. 4) adjusts the digital read-out frequency (e.g., by adjusting the rate of the clock pulse train delivered to the row scan controller) until the digital read-out pattern begins to toggle from sample to sample (i.e., '1,0,1,0, 1,0 . . . '). Note that this may require exposing the reset-marking pixel array to a relatively steady and reasonably bright light source. After a toggling digital read-out pattern is established, a sequence of analog reads is executed at 543 with respect to each reset-marking pixel at the frequency-adjusted digital read-out rate (thus ensuring two analog reads prior to each asynchronous reset), capturing analog samples $V_1$, $V_2$, $V_3$, $V_4$, and so forth. At 545, the reset differential, $V_d$, is algebraically determined based on one or more groups of three successively captured analog read-out values (the groups of three need not be limited to mutually exclusive sets of analog read-out values). More specifically, given analog read-out values $V_1$, $V_2$ and $V_3$ captured in successive analog read-outs, the center value $V_2$ should be lower than both $V_1$ and $V_3$ or greater than both $V_1$ and $V_3$ as shown in the two exemplary waveforms in FIG. 18. In the former case ($V_2$ lower than both $V_1$ and $V_3$), the reset differential may be determined by summing $V_1$ and $V_3$ and subtracting $2V_2$ (i.e., $V_1-V_2=V_2+V_d-V_3$, so that $V_d=V_1+V_3-2V_2$). Similarly, in the latter case, the reset differential may be determined by subtracting the sum of $V_1$ and $V_3$ from $2V_2$ (i.e., $V_d=2V_2-V_1-V_3$). In one embodiment, dedicated circuitry may be provided to perform the reset differential determination, in which case the groups of three analog read-out values may be filtered to identify only those groups of three analog values in which V2 is the peak or minimum in the group (i.e., to simplify the required circuitry). Also, whether filtered or not, multiple groups of three values may be applied in the algebraic determination of the reset differential, with outlier determinations (e.g., beyond a given statistical deviation) being disposed and the remaining determinations averaged or otherwise combined to produce a finalized calibrated value of the reset differential. More generally, other algebraic determinations of the reset differential may be executed (e.g., particularly when different analog read-out rates are applied such that there are more or fewer than two analog samples per asynchronous reset) and altogether different calibration techniques may be applied, including without limitation, generating analog samples of reset voltage and a distributed reference voltage (i.e., near-saturation threshold) at various points throughout the pixel array. However determined, the per-pixel calibrations of the reset differential may be applied by downstream logic (or even by hardware in the accumulator array) to generate reconstructed pixel values. Note that per-pixel calibration (or determination) of the reset differential may be executed as a one-time set and forget operation at sensor production time (i.e., with results stored in non-volatile memory) or during operation in response to user input or at image sensor startup. Alternatively, the calibration operation may be executed periodically or occasionally (e.g., in response to detecting particular conditions such as changes in temperature or voltage, passage of time, etc.) to compensate for drift or otherwise maintain sensor calibration.

FIG. 19 illustrates an embodiment of a 4T-AP reset-marking pixel 570 that may be deployed within a reset-marking pixel array of an image sensor as an alternative to the embodiment shown in FIG. 4. Reset-marking pixel 570 operates similarly to (and is constructed with many of the same circuit elements as) that shown in FIG. 4 except that the column read-out line is used to deliver a clear-enable signal that is gated with a row-logic generated clear signal ($\phi_{RCLR}$) to effect a conditional memory-clear operation. This arrangement obviates the dedicated column-clear line employed in embodiments described above, thus reducing the number of column-spanning signal lines required within the pixel array. Conveyance of the clear-enable signal is effected by an alternative sense amplifier embodiment 603 within each of column read-out circuits 601 and also by an alternative memory-reset circuit arrangement within each reset-marking pixel 570. More specifically, sense amplifier 603 includes reset-enable gate 605 (switched on and off in response to reset-enable signal $\phi_{RE}$) to feed the output of latching element 283 back to the column read-out line and thus reinforce the digital output on that signal line. Further, memory-clear circuit 575 includes a gate 579 coupled in a logic AND configuration such that when $\phi_{RCLR}$ and column read-out line are both at high logic states, the high-state of the column read-out line is conveyed via transistor 579 to the gate terminal of discharge transistor 577, thereby discharging the floating diffusion node 240 of the reset-marking pixel. Note that memory-set transistor 581 is coupled to the reset voltage source ($V_{DD}$ in this example) indirectly via asynchronous reset transistor 199 instead of being directly coupled to the reset voltage source as shown in FIG. 4.

FIG. 20 illustrates yet another embodiment 735 for a reset-marking pixel with non-selective reset upon digital readout. Pixel 735 operates with the same control signal lines as a traditional 4T active pixel, but with additional circuitry and functionality assigned to some of those lines. Pixel 735 includes a photodiode PD connected through a transfer gate 739 to a floating diffusion FD 740. Floating diffusion 740 connects to the gate of a source follower 737, which can be accessed on a readout line through a row select transistor 751. A reset transistor 738 also connects between a source voltage $V_{DD}$ and floating diffusion 740. Those skilled in the art will recognize this arrangement as that of a 4T pixel, and it is thus evident how to operate these elements to perform analog sampling of photodiode PD.

Reset-marking pixel 735 contains further circuitry, including a Schmitt trigger ST, a set transistor 741, a trigger disable transistor 743, a reset completion transistor 744, and a pixel reset transistor 745. Schmitt trigger ST has its input tied to the $V_{DET}$ node of photodiode PD through both trigger disable transistor 743 and reset completion transistor 744. Trigger disable transistor 743 is a PMOS transistor that is driven by the same row select signal that connects the source follower to the readout line whenever output from that row is desired. Accordingly, when the row containing pixel 735 is not selected, transistor 743 is on, such that discharge of the photodiode past a threshold can cause the output of ST to switch from low to high, as described for other embodiments above. When the row is selected, however, transistor 743 is off and cannot communicate a voltage related to $V_{DET}$ to ST.

Due to the asynchronous nature of the Schmitt trigger operation, it is possible that the row will be selected while ST is attempting a reset of the PD. In such a case, it is desirable that the reset be allowed to complete. Accordingly, reset completion transistor 744 provides an additional feedback path to allow an in-progress reset to continue even if the row is selected. In operation, if the ST output is high, reset completion transistor 744 is enabled, but then turns off when the ST output triggers low.

The output of Schmitt trigger ST is also supplied to the gates of set transistor 741 and pixel reset transistor 745. When the Schmitt trigger output is driven high, set transistor 741 connects the floating diffusion node FD to ground to discharge that node, and pixel reset transistor 745 connects photodiode output node VDET to VDD to reset the photodiode (and eventually reset the Schmitt trigger). Thus unlike the prior embodiments, an asynchronous reset event is stored on FD as a low, rather than a high, signal.

To perform a digital readout of pixel 735, the row is first selected. A short delay is then allowed in case ST is in the act of discharging the FD node, and then the readout line is sensed to determine whether an asynchronous reset has occurred since the last readout operation. Next, the reset signal is activated for the row, which allows reset transistor 738 to connect FD to $V_{DD}$. For pixels in the row that were not discharged by a reset event since the last digital read, no effect is registered at the FD (other than reset noise), but for pixels in the row that were discharged by a reset event since the last digital read, those pixels are reset to a high voltage. Finally, the row is deselected, which allows the Schmitt trigger to reconnect to the PD and sense a threshold crossing.

To perform an analog readout, a digital readout as described immediately above is first performed in case a set/pixel reset event has occurred since the last digital readout. Then, with the row select signal continuously maintained so that no further triggers of ST can occur, a CDS read of the PD signal is performed. Numerous other such circuit variations are possible without departing from the principles and techniques disclosed herein.

While a reset-event memory may be implemented with relatively few additional transistors beyond those needed to establish self-resetting functionality (i.e., asynchronous reset capability), altogether the total number of control/access transistors required in each reset-marking pixel may reduce the fill-factor to a level lower than desired in a given application. In those cases, a microlens array 623 may be disposed over a reset-marking pixel array 621 as shown in FIG. 21 (a portion of the microlens array has been removed to reveal the reset-marking pixels beneath) to focus light on the photodiodes of the reset-marking pixels (or other photosensitive elements if not photodiodes) and away from the pixel control/access circuitry. In one embodiment, for example, each pixel 625 within the reset-marking pixel array 621 is implemented by aggregating the control/access circuitry 626 (e.g., the various transistors shown in the embodiments described above) at one side of the pixel or at the periphery of the pixel so that a microlens 627 (i.e., part of microlens array 623) focuses light onto the photodiode and away from the side or periphery of the pixel region containing the control/access circuitry. Through this arrangement, the effective fill-factor of the reset-marking pixel array may be significantly increased to complement the increased dynamic range of the image sensor.

It should be noted that the various circuits disclosed herein can be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions can be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions can be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of bits, signal path widths, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

The section headings in the above detailed description have been provided for convenience of reference only and in no way define, limit, construe or describe the scope or extent of the corresponding sections or any of the embodiments presented herein. Also, various modifications and changes can be made to the embodiments presented herein without departing from the broader spirit and scope of the disclosure. For example, features or aspects of any of the embodiments can be applied, at least where practicable, in combination with any other of the embodiments or in place of counterpart features or aspects thereof. Accordingly, the specification and drawings are to be regarded in an illustrative rather than a restrictive sense.

What is claimed is:

1. A pixel for use in a digital image sensor, the pixel comprising:
    a photosensitive element that exhibits an output signal in response to incident light;
    a comparator to receive the output signal from the photosensitive element and to assert an asynchronous-reset signal upon detecting that the output signal exceeds a threshold;
    a reset circuit to reset the photosensitive element to an initial condition in response to assertion of the asynchronous-reset signal;
    a memory element to store, in response to assertion of the asynchronous-reset signal, a digital value indicating that the photosensitive element has been reset; and
    output circuitry to output from the pixel onto a multiplexed read-out line of the digital image sensor at respective times (i) a digital signal representative of the digital value stored within the memory element in a digital sampling operation, and (ii) an analog signal representative of the output signal of the photosensitive element in an analog sampling operation.

2. The pixel of claim 1 wherein the memory element comprises a floating diffusion node and wherein the output circuitry comprises a transfer gate to switchably couple and decouple the photosensitive element to and from the floating diffusion node according to the state of a transfer-gate control signal, and wherein the comparator receives the output signal from the photosensitive element regardless of the state of the transfer-gate control signal.

3. The pixel of claim 2 wherein the output circuitry further comprises an amplifier transistor having a gate terminal coupled to the floating diffusion node and a source terminal switchably coupled to the multiplexed read-out line.

4. The pixel of claim 1 wherein the reset circuit comprises a switching element coupled between a reset voltage node and the photosensitive element, and wherein the switching element is switched to a conducting state in response to assertion of the asynchronous-reset signal.

5. The pixel of claim 1 wherein the memory element comprises a capacitive element that is set to a first voltage level in response to assertion of the asynchronous reset signal, the first voltage level corresponding to a first state of the digital value and indicating that the photosensitive element has been reset during a time interval preceding the digital sampling operation.

6. The pixel of claim 5 further comprising a memory-clear circuit to set the capacitive element to a second voltage level when one or more control signals are in a predetermined state, the second voltage level corresponding to a second state of the digital value and indicating that the photosensitive element has not been reset during a time interval preceding the digital sampling operation.

7. The pixel of claim 5 wherein the capacitive element comprises a floating diffusion node and the output circuitry comprises a transfer gate coupled between the photosensitive element and the floating diffusion node and an amplifier transistor coupled between the floating diffusion node and the multiplexed read-out line.

8. The pixel of claim 1 wherein (i) the photosensitive element comprises an element that exhibits a decreasing output voltage in response to incident light, (ii) the comparator to assert the asynchronous-reset signal upon detecting that the output signal exceeds the threshold comprises circuitry to assert the asynchronous-reset signal upon detecting that the output voltage has fallen below the threshold, and (iii) the reset logic to reset the photosensitive element to an initial condition comprises a switching element to switchably couple the photosensitive element to a reset voltage node in response to assertion of the asynchronous-reset signal such that the output signal of the photosensitive element is raised to a level above the threshold.

9. The pixel of claim 1 further comprising:
an asynchronous-disable circuit to prevent assertion of the asynchronous-reset signal; and
a readout selection circuit, wherein a common control signal both disables the asynchronous-disable circuit and enables the readout selection circuit.

10. The pixel of claim 1 further comprising an asynchronous-disable circuit to prevent assertion of the asynchronous-reset signal, and wherein the reset circuit further comprises a partial reset completion circuit to allow completion of a reset of the photosensitive element in progress at a time when the asynchronous-disable circuit is enabled.

11. The pixel of claim 1 further comprising a transfer gate and wherein the memory element is a floating diffusion, the transfer gate coupled between the photosensitive element and the floating diffusion, the floating diffusion and transfer gate operated to transfer an analog charge from the photosensitive element to the floating diffusion.

12. A method of operation within a pixel for use in a digital image sensor, the method comprising:
generating, within a photosensitive element, an output signal that changes in response to incident light;
asynchronously determining whether the output signal exceeds a threshold;
in response to determining that the output signal exceeds the threshold, resetting the output signal to a level that does not exceed the threshold and storing a digital value within the pixel to indicate that the output signal has been reset; and
outputting from the pixel onto a multiplexed read-out line of the digital image sensor at respective times (i) a digital signal representative of the digital value stored within the pixel, and (ii) an analog signal representative of the output signal of the photosensitive element.

13. The method of claim 12 wherein outputting the digital signal and an analog signal at respective times comprises storing the digital value and an analog value within a common circuit element at respective times, the analog value having a voltage level corresponding to the output signal of the photosensitive element.

14. The method of claim 13 wherein storing the digital value and the analog value within the common circuit element comprises storing the digital value and the analog value within a floating diffusion node that is switchably coupled to the photosensitive element via a transfer gate.

15. The method of claim 13 wherein outputting the digital signal onto the multiplexed read-out line of the sensor comprises outputting the digital signal when one or more control signals are in a first state corresponding to a digital sampling operation, and wherein outputting the analog signal comprises outputting the analog signal when the one or more control signals are in a second state corresponding to an analog sampling operation.

16. The method of claim 12 wherein generating the output signal in response to incident light comprises exposing the photosensitive element to light, and wherein resetting the output signal to a level that does not exceed the threshold comprises switchably coupling the photosensitive element to a reset voltage node.

17. The method of claim 12 wherein storing the digital value within the pixel comprises setting a capacitive element to a first voltage level in response to determining that the output voltage exceeds the threshold, the first voltage level corresponding to the first value indicating that the output voltage has been reset.

18. The method of claim 17 further comprising setting the capacitive element to a second voltage level when one or more control signals are in a predetermined state, the second voltage level indicating that the photosensitive element has not been reset.

19. The method of claim 17 wherein outputting the digital signal representative of the digital value comprises enabling a signal indicative of the voltage level of the capacitive element to be output from the pixel onto the multiplexed read-out line of the digital image sensor in a synchronous digital sampling operation, the synchronous digital sampling operation enabling an external circuit to determine whether the photosensitive element has been reset.

20. The method of claim 12 wherein generating the output signal that changes in response to incident light comprises generating an output voltage that decreases in response to incident light, and wherein determining whether the output signal exceeds the threshold comprises determining whether the output voltage has fallen below the threshold, and wherein resetting the output signal to a level that does not exceed the threshold comprises increasing the output voltage to a level above the threshold.

21. A pixel for use in a digital image sensor, the pixel comprising:
- a photosensitive element to generate an output signal that changes in response to incident light;
- a comparator to receive the output signal from the photosensitive element and to assert an asynchronous-reset signal when the output signal exceeds a threshold;
- a capacitive node having a capacitance sufficient to hold a charge level indicative of a first logic state for at least a predetermined duration;
- a first switching element coupled between a first supply voltage node and the capacitive node, the first switching element having a control input coupled to receive the asynchronous-reset signal from the comparator; and
- a second switching element coupled between the first supply voltage node and the photosensitive element, the second switching element having a control input coupled to receive the asynchronous-reset signal from the comparator; and
- a third switching element coupled between the capacitive node and a second supply voltage node.

* * * * *